United States Patent
Shah et al.

(10) Patent No.: US 7,904,548 B2
(45) Date of Patent: Mar. 8, 2011

(54) SYSTEM AND METHOD OF MONITORING AN ENTERPRISE WIDE RFID DEPLOYMENT USING STANDARDS BASED JMX TECHNOLOGY

(75) Inventors: Mayur Suresh Shah, Fremont, CA (US); Sumant Munjal, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 444 days.

(21) Appl. No.: 11/381,882

(22) Filed: May 5, 2006

(65) Prior Publication Data
US 2007/0233829 A1 Oct. 4, 2007

Related U.S. Application Data

(60) Provisional application No. 60/788,468, filed on Mar. 31, 2006.

(51) Int. Cl.
*G06F 15/173* (2006.01)
(52) U.S. Cl. ......... 709/224; 709/220; 709/221; 709/223; 715/736
(58) Field of Classification Search .................. 709/224, 709/220, 221, 223; 715/736
See application file for complete search history.

(56) References Cited

U.S. PATENT DOCUMENTS

| | | | |
|---|---|---|---|
| 5,910,988 A * | 6/1999 | Ballard | ........................... 705/75 |
| 6,222,540 B1 | 4/2001 | Sacerdoti | |
| 6,397,334 B1 | 5/2002 | Chainer et al. | |
| 6,664,897 B2 | 12/2003 | Pape et al. | |
| 6,671,358 B1 | 12/2003 | Seidman et al. | |
| 6,681,990 B2 | 1/2004 | Vogler et al. | |
| 6,738,628 B1 | 5/2004 | McCall et al. | |
| 6,759,072 B1 | 7/2004 | Gutwein et al. | |
| 6,793,127 B2 * | 9/2004 | Alsafadi et al. | ............... 235/375 |
| 6,843,415 B2 | 1/2005 | Vogler | |
| 6,847,892 B2 | 1/2005 | Zhou et al. | |
| 6,853,294 B1 | 2/2005 | Ramamurthy et al. | |
| 6,853,894 B1 | 2/2005 | Kolls | |
| 6,895,310 B1 | 5/2005 | Kolls | |
| 6,925,471 B2 | 8/2005 | Bodin et al. | |
| 6,933,849 B2 | 8/2005 | Sawyer | |
| 6,934,532 B2 | 8/2005 | Coppinger et al. | |
| 6,937,154 B2 | 8/2005 | Zeps et al. | |
| 6,965,324 B1 | 11/2005 | Suggs, Sr. | |
| 6,977,512 B2 | 12/2005 | Bennett | |
| 7,394,377 B2 * | 7/2008 | Banerjee | .................... 340/572.1 |
| 7,423,527 B2 * | 9/2008 | Bajwa et al. | ............. 340/539.16 |
| 2002/0116274 A1 | 8/2002 | Hind et al. | |
| 2003/0037243 A1 | 2/2003 | Gruteser et al. | |
| 2003/0038172 A1 | 2/2003 | Bodin et al. | |
| 2003/0135417 A1 | 7/2003 | Bodin | |
| 2003/0144926 A1 | 7/2003 | Bodin et al. | |
| 2003/0216983 A1 | 11/2003 | Bodin | |
| 2004/0122936 A1 * | 6/2004 | Mizelle et al. | ................ 709/224 |
| 2005/0052284 A1 | 3/2005 | Schmidtberg et al. | |

(Continued)

OTHER PUBLICATIONS

"The Application Level Events (ALE) Specification Version 1.0", Sep. 15, 2005, 71 pages, EPCglobal.

*Primary Examiner* — Krista M Zele
*Assistant Examiner* — Andrew Georgandellis
(74) *Attorney, Agent, or Firm* — Fliesler Meyer LLP

(57) ABSTRACT

An RFID administration server can provide administration and monitoring for the multiple RFID edge servers. An RFID Management console can allow a user to administer the multiple RFID edge servers.

17 Claims, 13 Drawing Sheets

U.S. PATENT DOCUMENTS

| | | |
|---|---|---|
| 2005/0131900 A1 | 6/2005 | Palliyll et al. |
| 2005/0187368 A1 | 8/2005 | Ebling et al. |
| 2005/0198228 A1* | 9/2005 | Bajwa et al. .................. 709/220 |
| 2005/0234641 A1 | 10/2005 | Marks et al. |
| 2005/0288978 A1 | 12/2005 | Furland et al. |
| 2006/0006999 A1 | 1/2006 | Walczyk et al. |
| 2006/0022801 A1 | 2/2006 | Husak et al. |
| 2006/0076401 A1* | 4/2006 | Frerking ....................... 235/380 |
| 2006/0082444 A1* | 4/2006 | Sweeney et al. ............. 340/10.3 |
| 2006/0092861 A1* | 5/2006 | Corday et al. ................. 370/256 |
| 2006/0095561 A1 | 5/2006 | Childress et al. |
| 2006/0168112 A1* | 7/2006 | Weng et al. .................... 709/218 |
| 2006/0282330 A1 | 12/2006 | Frank et al. |
| 2007/0027966 A1 | 2/2007 | Singhal et al. |
| 2007/0250358 A1* | 10/2007 | Le ..................................... 705/7 |

* cited by examiner

US 7,904,548 B2

SYSTEM AND METHOD OF MONITORING AN ENTERPRISE WIDE RFID DEPLOYMENT USING STANDARDS BASED JMX TECHNOLOGY

CLAIM OF PRIORITY

This application claims priority to U.S. Provisional Application No. 60/788,468 entitled "RFID Monitoring Improvements" filed Mar. 31, 2006, which is incorporated herein by reference.

BACKGROUND OF INVENTION

Radio Frequency Identification (RFID) tags and systems have become increasingly popular. RFID tags respond to an interrogation from an RFID reader to provide a response including an identification code, such as an electronically product code (EPC). The RFID tags can be placed within packages to track products through the supply chain.

Companies are increasing their use of RFID technology to track goods and manage supply chains with partners and suppliers. In a typical enterprise (retail, defense, transportation, etc.) RFID Systems are deployed across all sites (remote stores/locations) of the company. These RFID systems can consist of multiple deployments of physical devices (RFID readers, printers, antennas, etc.) as well as software entities (ALE middleware, Edge Server, applications) that communicate with the physical entities.

DETAILED DESCRIPTION

Due to the distributed nature of the RFID deployment within an enterprise, it can be useful to manage and configure RFID resources from one central location. Embodiments of the present invention concern a system and method of configuring and monitoring enterprise wide RFID deployments.

Figure 1:
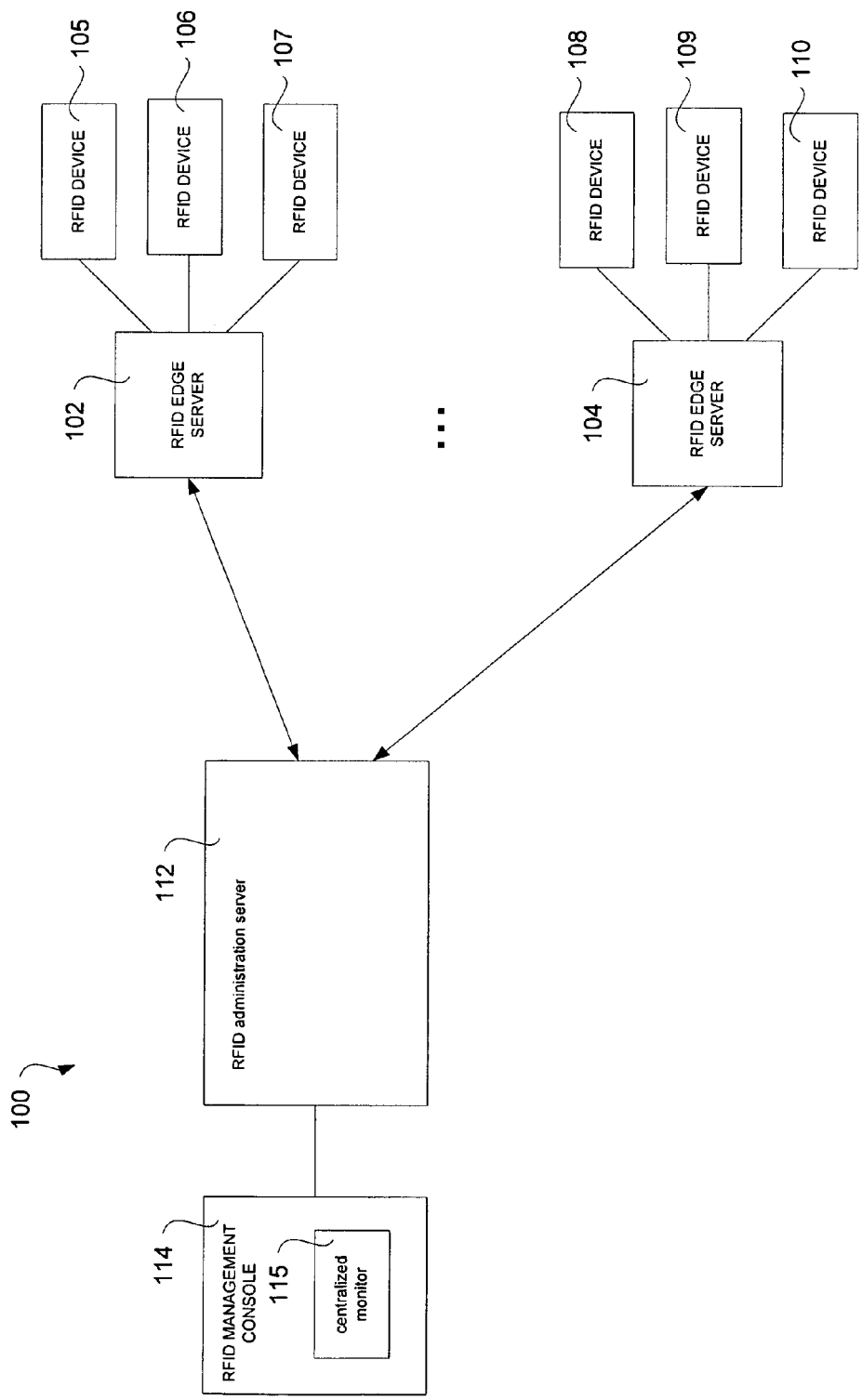
FIG. 1 is a diagram of one embodiment of the present invention.

One embodiment of the present invention is shown in FIG. 1. A computer implemented system 100 can comprise a number of RFID edge servers 102 and 104 associated with RFID devices (printers, readers, PLC, stacklight etc) 105-107 and 108-110. An RFID administration server 112 can provide administration and monitoring for the RFID edge servers. An RFID Management console 114 can allow a user to administer the RFID edge servers 102 and 104.

The RFID edge servers 102 and 104 can optionally interact with an EPCIS server 116.

The RFID edge servers 102 and 104 can use the ALE protocol to filter the data from and otherwise manage the RFID devices 105-107 and 108-110. The RFID edge servers 102 and 104 can additionally contain business logic in the form of workflows Application Level Events (ALE) is a standard created by EPCGlobal, Inc., an organization of industry leaders devoted to the development of standards for the Electronics Product Code (EPC) and Radio Frequency Identification (RFID) technologies. The ALE specification is a software specification indicating required functionality and behavior, as well as a common API expressed through XML Schema Definitions (XSD) and Web Services Description Language (WSDL).

The ALE specification allows aggregation and filtering of tag data over a period of time. An ALE server allows people to specify when to start collecting data, when to stop collecting data, how to organize and sort the data and when to send the data to interested parties. An ALE client allows people to communicate with any compatible ALE server to define data requirements and receive reports.

In one embodiment, the RFID edge servers 102 and 104 can be lightweight applications running on a PC, an embedded device, or other computer.

An example of an RFID edge server is the RFID Tag Aware™ product available from BEA Systems, Inc., of San Jose, Calif.

The RFID administrative server 112 can do a number of administrative and management services for the multiple RFID edge servers 102 and 104 as discussed below.

The RFID management console provides users to do administration and management of the RFID edge servers 102 and 104 and RID devices 105-107 and 108-110.

One embodiment of the present invention is a computer implemented system 100 that obtains information for multiple RFID edge servers 102 and 104 and their associated RFID edge devices 105-107 and 108-110. The system provides a centralized monitor 115 for the multiple RFID edge servers 102 and 104 and the associated RFID devices 105-107 and 108-110.

The monitor 115 can be used to control the multiple RFID edge servers and the associated RFID devices. The monitor 115 can be part of a console 114. The monitor 115 can be displayed on a web browser.

One embodiment of the present invention is a computer readable medium including code for obtaining information for multiple RFID edge servers 102 and 104 and associated RFID devices 105-107 and 108-110 and providing a centralized monitor 115 for the multiple RFID edge server 102 and 104 and the associated RFID devices 105-107 and 108-110.

Figure 2A:
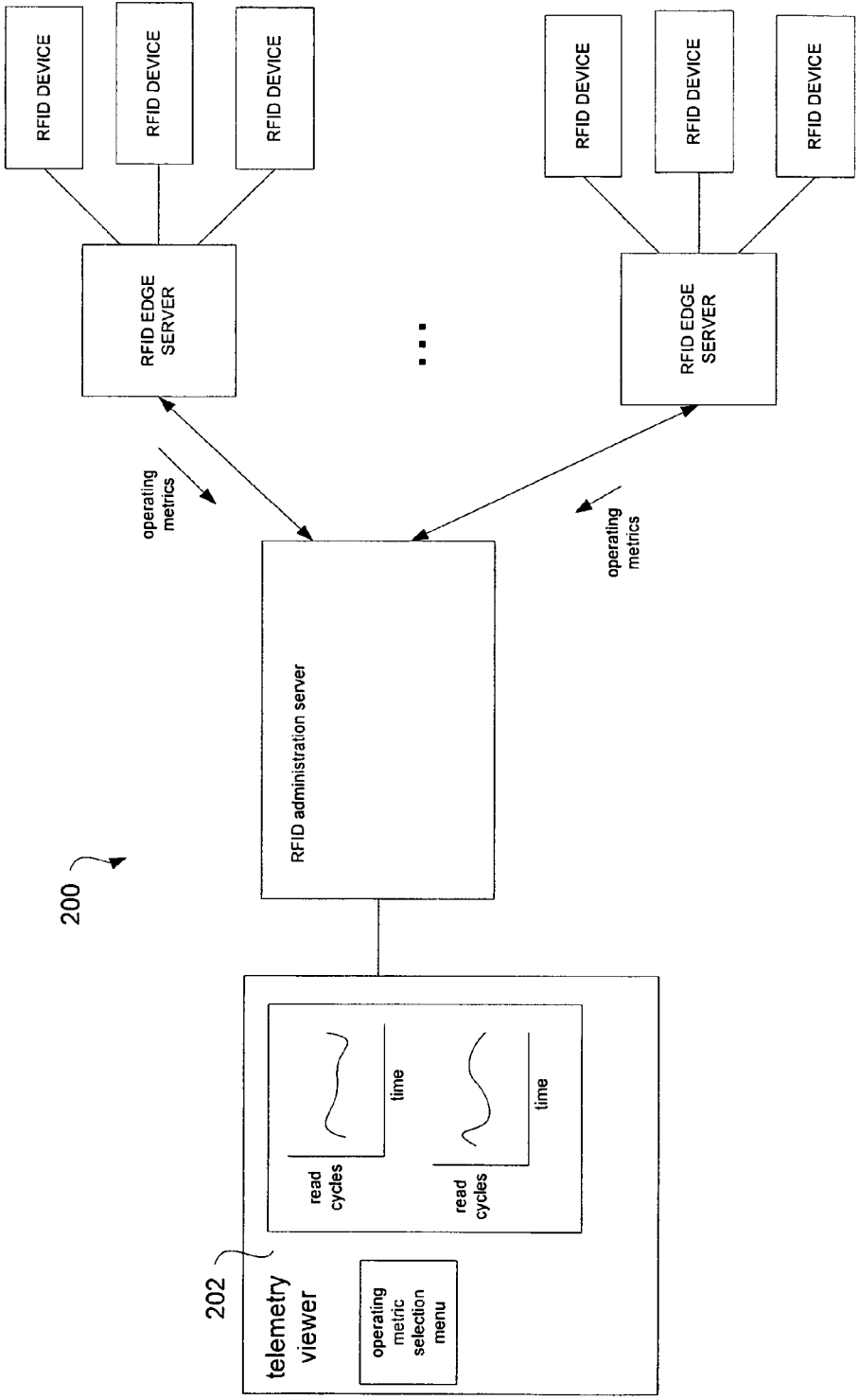
FIG. 2A is a diagram of a telemetry system of one embodiment of the present invention.

FIG. 2A illustrates one embodiment of the present invention. A computer-implemented system 200 can obtain operating metrics concerning multiple RFID edge servers and their associated RFID devices. The system 200 produces a graphical display 202 of at least one of the operating metrics versus time.

The operating metrics can relate to the ALE protocol. For example, one of the operating metrics can be event cycles completed or read cycle time.

A read cycle in the ALE protocol is the smallest unit of interaction between a reader scanning for tags and the reader reporting the data to the ALE service. The Event Cycle in the ALE protocol is the smallest unit of interaction between the ALE interface and a client. It can consist of zero or more Read Cycles, from one or more readers that are to be treated as a unit from a client perspective.

Some of the operating metrics can concern RFID reader operations. The operating metrics can be provided by multiple RFID edge servers. An RFID administration server can subscribe to get the operating metrics. The RFID edge servers can send the subscribed operating metrics to the RFID administration server.

In one embodiment the graphical display 202 allows the dragging and dropping of operating metrics selections for RFD edge readers. The graphical display 202 can show multiple operating metrics versus time concurrently.

One embodiment of the present invention is a computer readable storage medium containing code for obtaining operating metrics concerning multiple RFID edge servers and associated RFID devices and producing a graphical display of at least one operating metrics versus time.

Figure 2B:
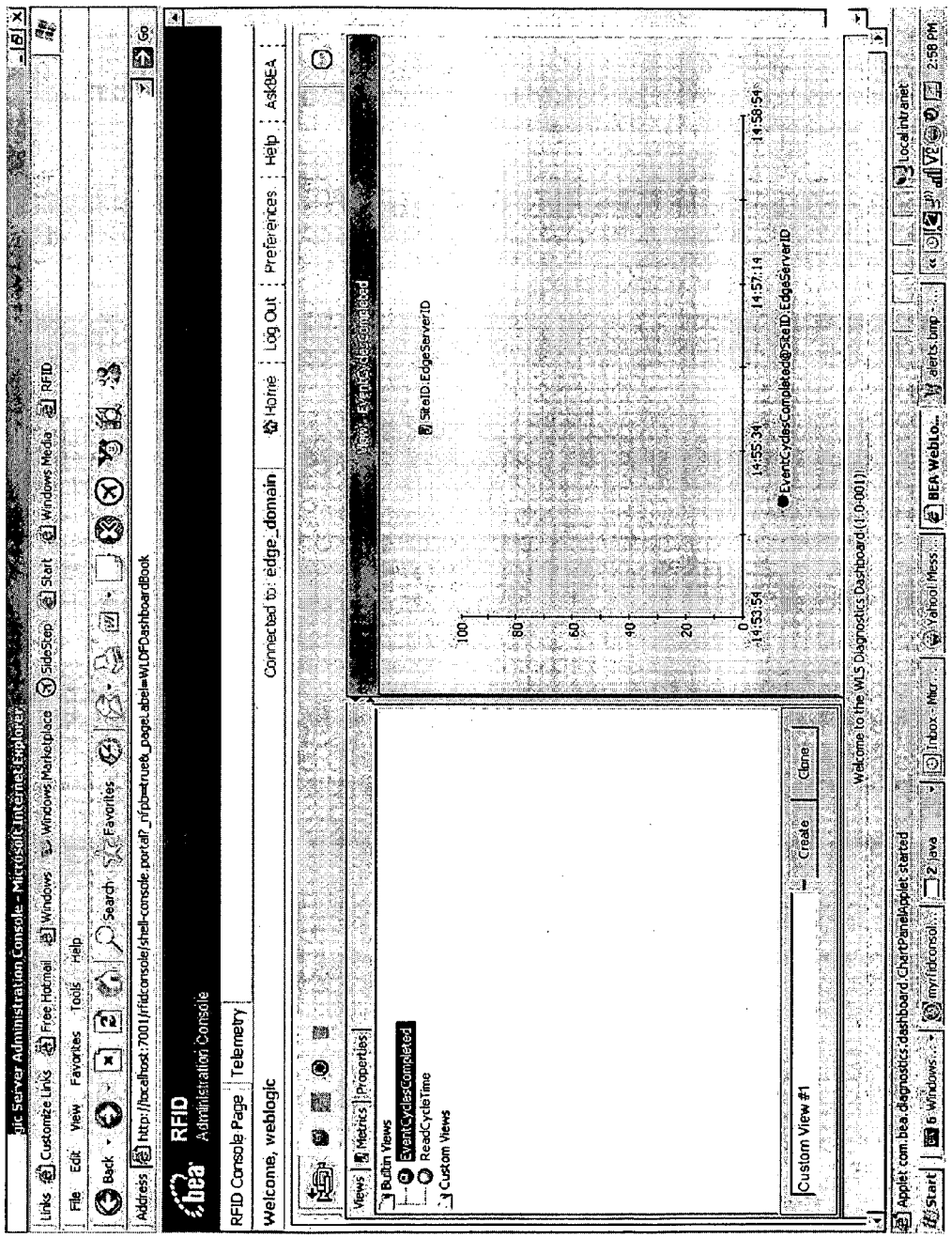
FIG. 2B is a diagram of one interface for the telemetry data.

FIG. 2B illustrates an exemplary user interface for a system that allows operating metrics displays from multiple RFID edge servers.

A data structure can be used to model management entities of multiple RFID edge servers to aid in the operation of an RFID administration server.

Operating metrics per edge server can be determined dynamically, depending on the instance of the edge server and its associated RFID entities.

In one embodiment, the console can query each edge server to determine the available operating metrics for each RFID edge server and associated RFID devices. Users can select one or more of the available metrics to begin the collection of the metric data. This operating metric data can then be displayed at the console.

Charts can be overlaid with operating metrics independent of edge server and RFID entities. The system can provide a user specific, customizable view, specifying the type of charts, built in views, coloring, metrics to graphs and the option of persisting these charts preferences.

Figure 3A:
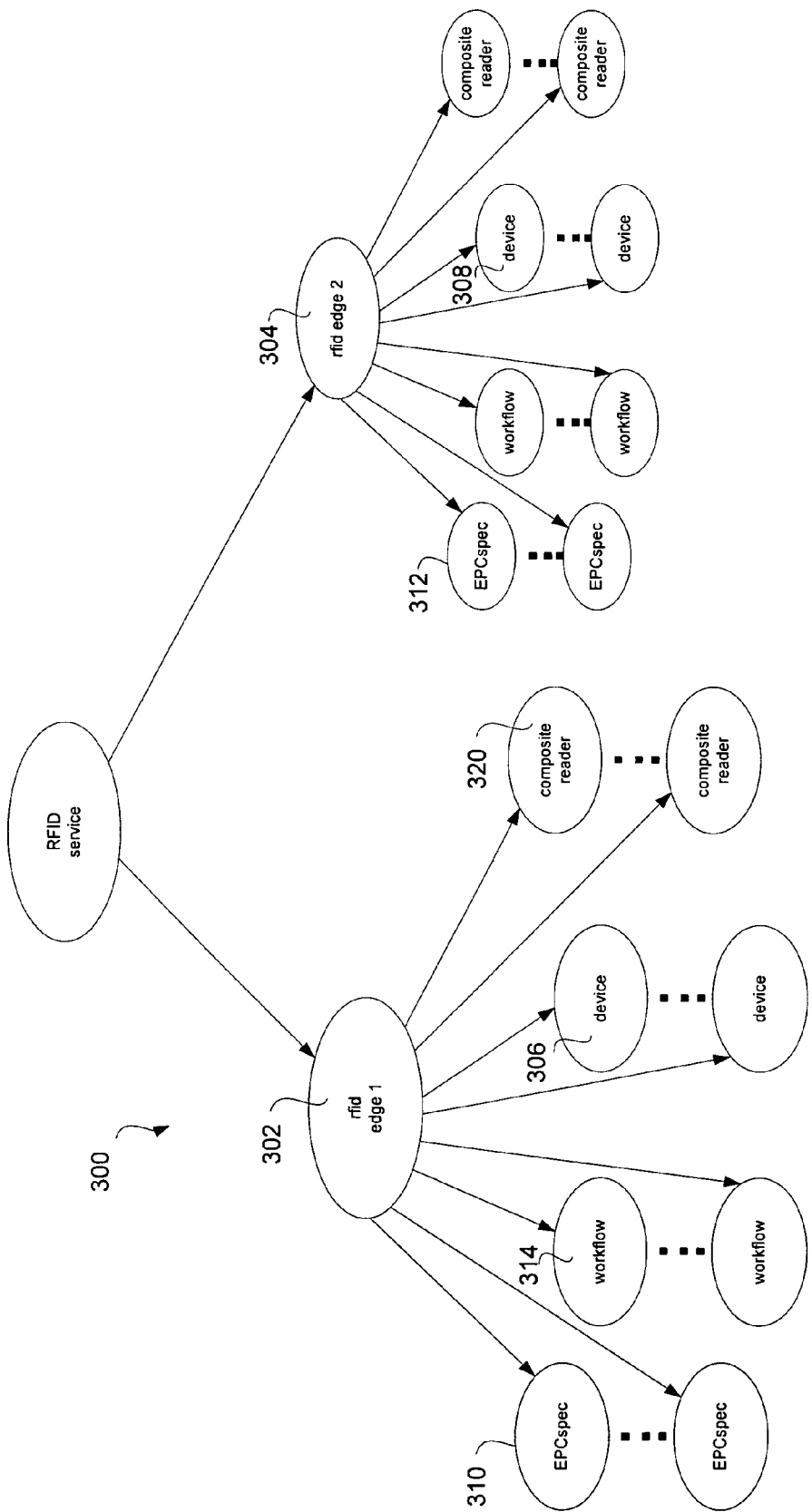
FIG. 3A is a diagram of data structure of one embodiment of the present invention.

FIG. 3 shows a data structure of one embodiment of the present invention. One embodiment of the present invention is a computer readable storage medium containing a data structure for storing management information concerning RFID edge servers 302 and 304. The data structure 300 is hierarchical. The data structure includes RFID edge server information 302 and 304 with associated management entities. The associated management entities for each edge server can include one or more of RFID Reader 306, ECSpec 310, Workflow 314, and Composite Reader 320.

An ECSpec can describe an event cycle and one or more reports that are to be generated from it. For example, it can contain a list of logical Readers whose read cycles are to be included in the event cycle, a specification of how the boundaries of event cycles are to be determined, and a list of specifications each of which can describe a report to be generated from this event cycle.

Each RFID edge server can have multiple associated workflows 314. Each RFID edge server can have multiple RFID readers. The RFID edge servers can be polled to get data from the data structure. The data structure 300 can be used to provide a console display. The data structure 300 can be used to create alerts. The data structure 300 can be used to produce a monitor display.

One embodiment of the present invention is a computer readable storage medium containing a data structure 300 for storing management information concerning RFID edge servers and RFID devices. The RFID edge server information can have associated workflow data 314.

One embodiment of the present invention is a computer readable storage medium containing an MBean hierarchy 300 for storing management information concerning multiple RFID edge servers. The RFID edge server data 302 can have associated data including RFID reader information 306, workflow information 314, EPC specs information 310, and composite reader information 320.

Composite Readers are logical readers that combine set of physical RFID readers as one group. They can be used within ECSpec to identify group of readers based on composite name, thereby providing the flexibility of adding physical readers to the group without having to change the ECSpec itself.

One representation of the hierarchy can be an Mbean instance model. The data model can be hosted either on the admin server or on each individual edge servers. Data model can be integrated with third party management consoles to provide alerts and monitoring for the entire RFID system deployed within the enterprises.

Figure 3B:
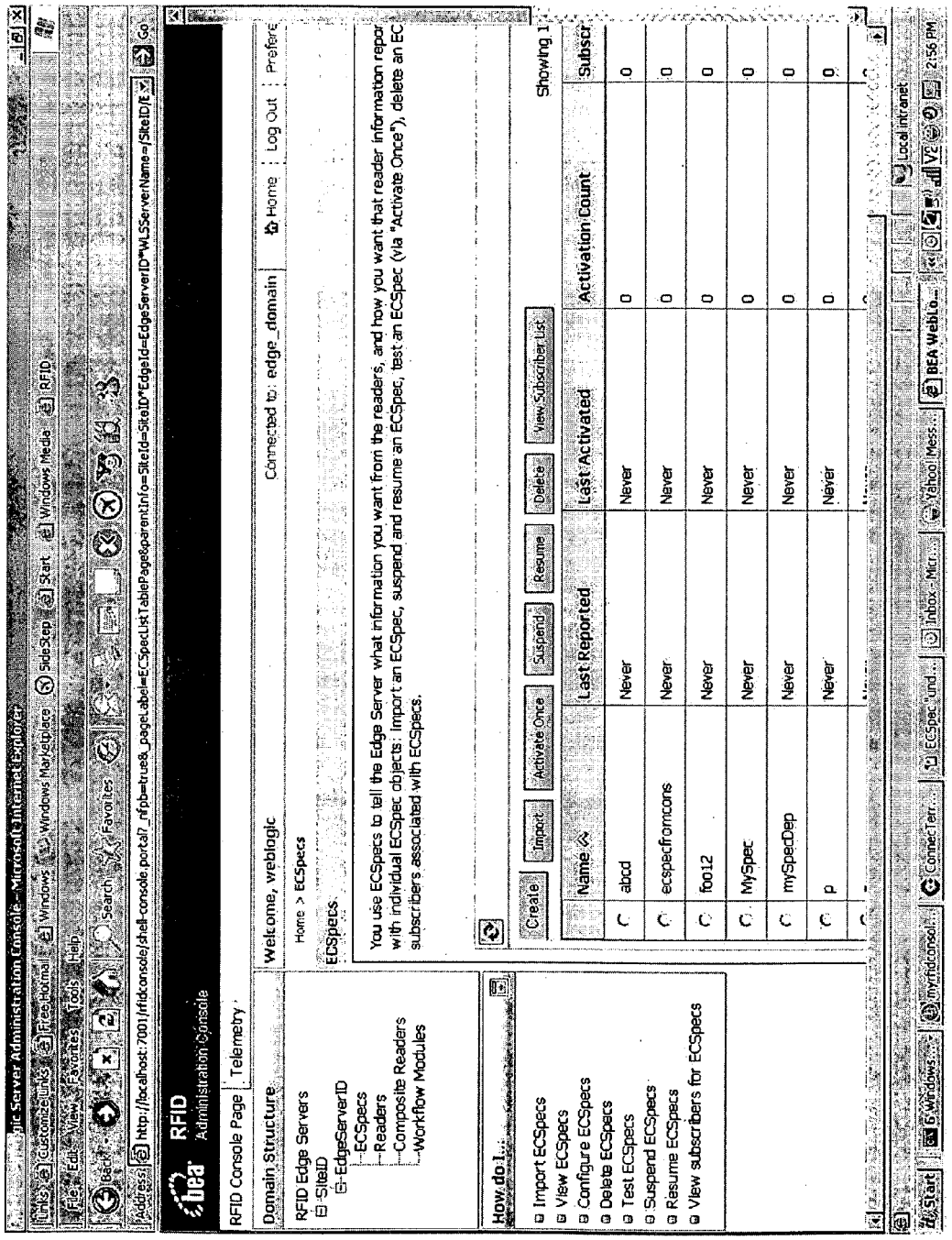
FIG. 3B is a diagram of an interface showing the selection of an ECSpec of one embodiment of the present invention.

FIG. 3B shows a user interface for the selection and updating of RFID edge server with ECSpecs. The ECSpecs can be created, modified and sent to the RFID edge server.

One embodiment of the present invention is a computer implemented system 400 that polls multiple RFID edge servers 402 and 404 to determine state information concerning the multiple RFID edge servers 402 and 404 and their associated RFID devices, 405-407 and 408-410. The system can produce alerts concerning changes in the state of the RFID edge server 402 and 404 and associated RFID devices 405-407 and 408-410.

The system 400 can update data structure 412 with the poll data. The system can produce a graphical display 414 with the alert data. The system 400 can compare data obtained from the RFID edge servers with data in data structure 412 to determine the alerts. The system can also obtain operating metrics from the RFID edge server 402 and 404. The operating metrics can be graphically displayed versus time. The alerts can be sent to a third party monitoring software. The third party monitoring software can subscribe to the alerts.

One embodiment of the present invention is a computer implemented system 400 that polls multiple RFID edge servers to determine state information concerning the multiple RFID edge servers 402 and 404 and their associated RFID devices 405-407 and 408-410. The system 400 can produce alerts concerning changes in the state of the multiple RFID edge servers 402 and 404 and associated RFID devices 405-407 and 408-410. The system can provide the alerts to a graphical display 414.

One embodiment of the present invention is a computer readable storage medium containing code for polling multiple RFID edge servers 402 and 404 to obtain state information concerning the multiple RFID edge servers 402 and 404 and associated RFID devices 405-407 and 408-410; and, code for producing alerts concerning the RFID edge servers 402 and 404 and associated RFID devices 405-407 and 408-410 using the state information.

Figure 4A:
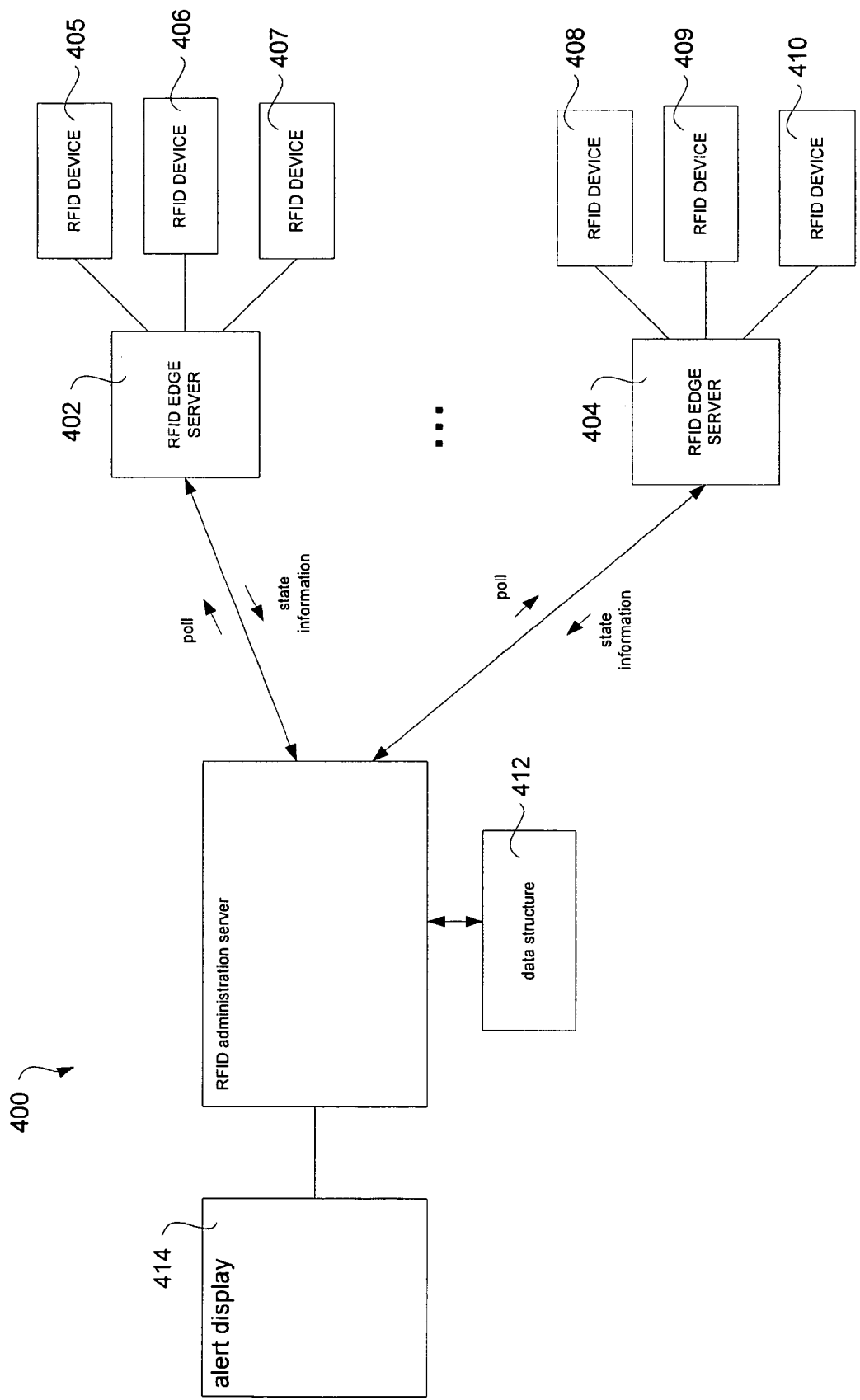
FIG. 4A shows a system to provide RFID alerts.
Figure 4B:
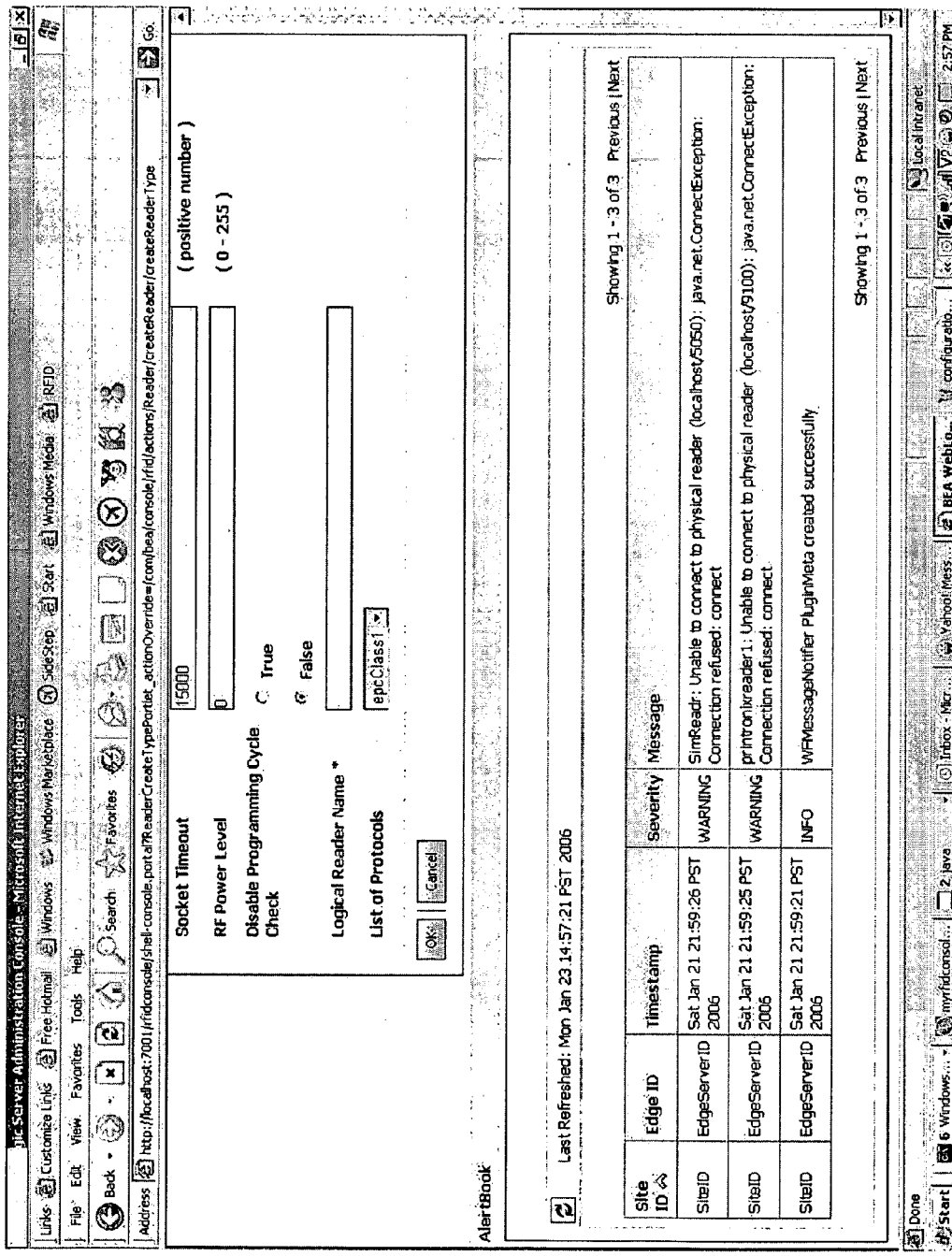
FIG. 4B shows an exemplary RFID console page showing RFID alerts.

FIG. 4B illustrates an exemplary user interface that displays alerts. The Alerts can be in an alert display that is part of an administration console or other graphical interface.

Figure 5:
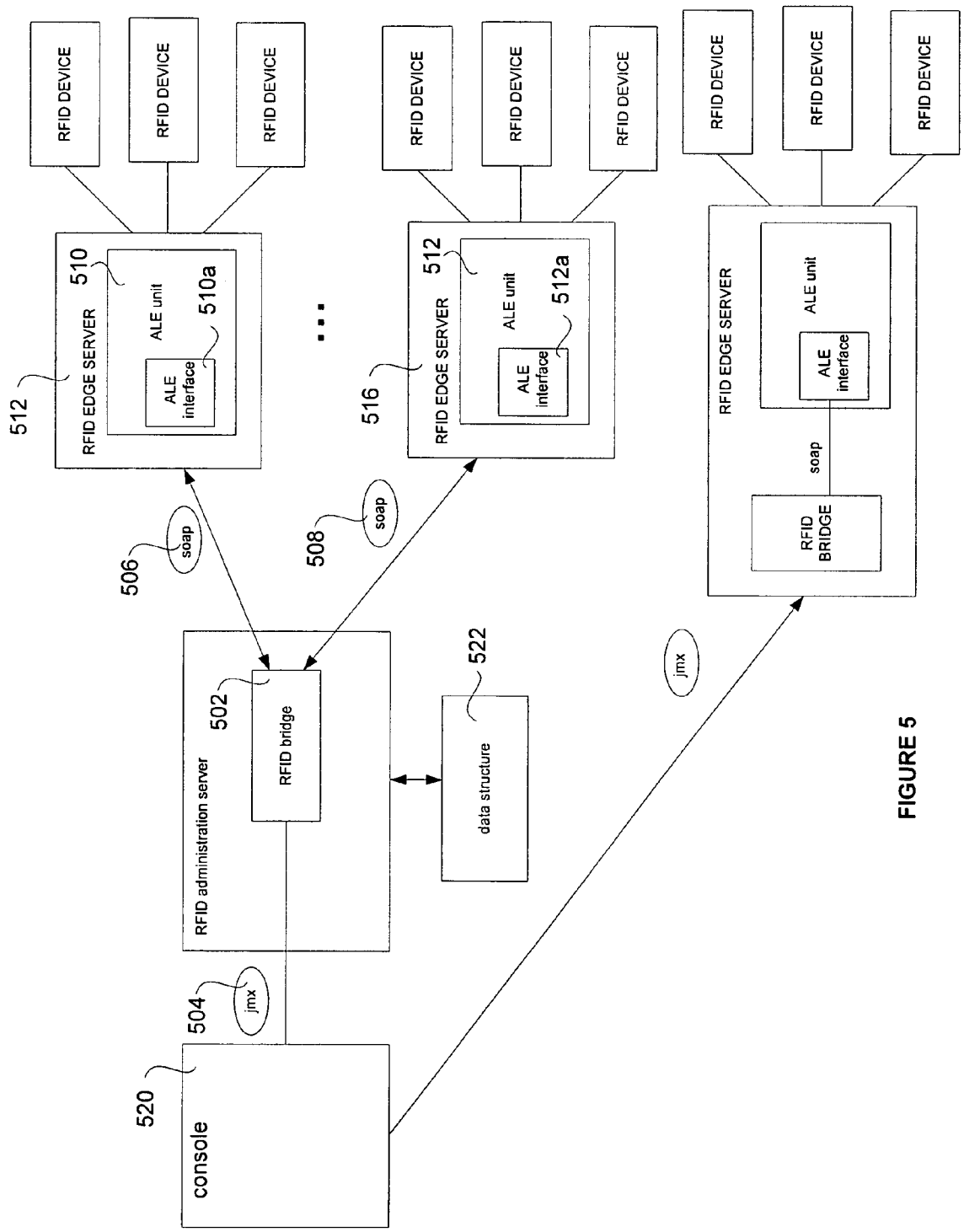
FIG. 5 shows an exemplary system with an RFID bridge.

FIG. 5 shows the use of a computer-implemented system 500. An RFID bridge 502 can provide translation of management messages 504 to SOAP messages 506 and 508 for ALE units 510 and 512 at multiple RFID edge servers 514 and 516. A console 520 can use the RFID bridge to manage the multiple edge servers 514 and 516.

The management message 504 can be JMX messages. The SOAP messages 506 and 508 can be sent to an ALE interfaces 510 and 512 as part of a web service. The RFID bridge 502 can interact with a hierarchical data model 522 that models RFID edge servers, and their associated RFID devices (readers, workflow, printers etc). The bridge 502 can listen for telemetry data (real time operating metrics). The bridge 502 can receive alert data related to the changes at the RFID edge servers. The bridge 502 can poll the RFID edge servers for data. The bridge 502 can use Mbeans to store state information for the multiple RFID servers.

One embodiment is an RFID bridge to provide a translation of management messages to SOAP messages 506 and 508 for ALE units 510 and 512 at multiple RFID edge servers 614 and 516. One embodiment is a computer readable storage medium containing code to do the steps of translating management messages 504 to SOAP messages 506 and 508 to be provided to ALE units 510 and 512 at multiple RFID edge servers 514 and 516 and translating SOAP message from the ALE units to management messages.

The RFID Bridge can be hosted on the admin server or on individual edge servers.

One embodiment of the present invention is a computer-implemented system including a bridge at an RFID edge server that translates management messages to SOAP messages for an ALE unit at the RFID edge server.

One embodiment of the present invention is an RFID bridge to provide management of RFID edge servers. The RFID bridge can be hosted on any application server container or a standalone edge server; wherein the RFID bridge provides management interfaces that can be scripted using standard scripting tools.

The RFID bridge can poll the RFID edge servers for data.

Figure 6A:
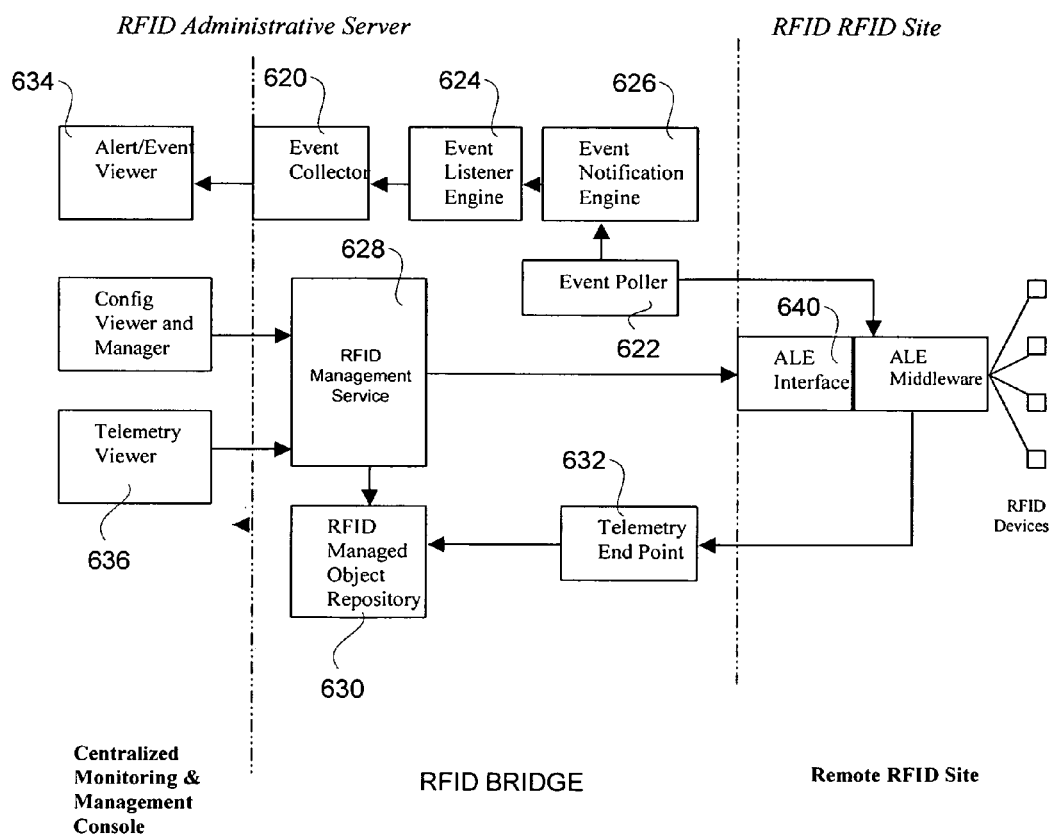
FIG. 6A is a diagram of an RFID administration server of one embodiment of the present invention.

FIG. 6A show an exemplary RFID administration architecture. Enterprise can have multiple remote RFID sites. RFID administrators can use the RFID Administration server to remotely configure and monitor all the entities including (RFID edge servers and RFID devices) of the remote site. The Remote RFID site can be a combination of hardware and software system. These can include:

Standard software middleware that implements the ALE interface
Physical hardware devices that include and are not limited to, RFID readers, printers, stacklights, PLC etc.

A RFID Bridge can sit on the Administrative Server to remotely manage multiple such RFID remote sites.

The RFID Bridge can include the following:
Event Collector 620
Event Poller 622
Event Listener 624
Event Notification Engine 626
RFID Management Service 628
RFID Managed Object Repository 630
Telemetry End Point 632

The Administrative user interface can initiate a request on behalf of the user, to fetch some RFID configuration information or update some information on the remote RFID site. This request can be received by the RFID Management Service 628. RFID Management Service can have the smarts built in to transform the request into a corresponding SOAP request for the ALE middleware. The request can be for any Remote RFID Site, the RFID Management Service can look up the RFID managed object repository to find out for which remote site, the request is for. After finding out the remote site for which the request is for, the RFID Management Service 628 can than create a SOAP request and invokes an ALE interface over the wire on the remote RFID site.

This can result in a SOAP response from the remote RFID Site that is received by the RFID Management Service 628; it then updates RFID Managed object repository 630 based on the response, and then sends back the response to the administrative user interface.

The RFID managed Object repository 630 can also be updated periodically to reflect the changes in the data model of the remote RFID site.

This model can be used for doing remote configuration and monitoring of any device on the Remote RFID site. The RFID administration server can be used to generate and view alerts/events across multiple remote RFID sites.

Remote RFID sites can be geographically dispersed, and may have limited connectivity to the centralized administrative server. Monitoring the health of remote RFID entities (devices, applications, readers etc) from a single location can be valuable to a RFID administrator.

The Event Poller module 622 can be configured to periodically poll a specific RFID remote site, to monitor the health of various entities deployed at that site. When the Event Poller detects a change in operation (failure, correction) of an entity, it can raise an event for the notification engine for that corresponding entity.

Each event can have attributes to identify when, where, and what happened. For example, if the ALE Container failed to make a valid connection to a configured RFID reader (R1) at location Remote Site 1, the Event Poller can identify this, and generate an event that contains the attributes of (TimeStamp, Location: Remote Site1: Desc: DOWN) automatically.

The Event poller 622 can then send this event to the Event Notification Engine 626. The Event Notification Engine 626 can then raise this event, to all the registered Event Listeners within the System. Enterprise Management Console can also register their listeners to receive such events.

The Event Listener Engine 624 can then get the Event raised, and then update the Centralized repository of Events on the Administrative Server. This way as and when event are generated across multiple RFID sites, they will get collected in this repository.

The RFID Administrative Server can also include or be associated with an Alert/Event Viewer module 634 user interface to look at all these events generated in real time to take corrective action.

The RFID administration server can also be used to view and graph RFID telemetry data from remote RFID sites. One example of this is RFID Devices can provide useful metrics regarding the functioning of the same. These device metrics can be represented in the form of graphs and charts.

The RFID Management Service 628 initiates the collection of data for a specific Edge Server metric on a request initiated by the user. The RFID management Service can then make a SOAP request to the ALE interface on the remote RFID site, to initiate the metric collection to a telemetry end point. The Telemetry end point 631 can be any URI (file, url, jms etc). The telemetry URI can have smarts built in to filter the data for the request metric of a device on the specific Remote RFID site. The metric value of a specific device attribute can then be updated on the RFID managed object repository 630, at that point in time.

The RFID Management Service 628 can then read a specific value at a given point in time, and pass it to the Telemetry viewer 636 to be plotted on the chart.

The telemetry viewer can plot metrics across multiple remote sites and device at the same time.

A typical application server domain can consist of an Administration Server and additional Application Servers, instances either in clustered or non-clustered environment. The administration server and additional application servers can be WebLogic Server™ available from BEA Systems, Inc., of San Jose, Calif. The Administration Server can be the central point for all management and configuration of all the nodes and this can be done using JMX. All management artifacts in a domain can be represented as Management Beans (MBeans) in the domain. Each application server can instance support JMX based management servers which provides remote and local management of these managed object.

RFID Enterprise domain can be different from a typical application server domain, since it can manage not only application server nodes/instances but also standalone RFID edge server or other RFID edge server. The RFID edge server can be running simply on a Java Virtual Machine (JVM) in a remote location possibly over a thin network pipe. To manage such RFID edge server from an Administration Server, a new management layer (RFID Bridge) is used. RFID Bridge can be collocated with the Administration Server or can be independent.

Figure 7:
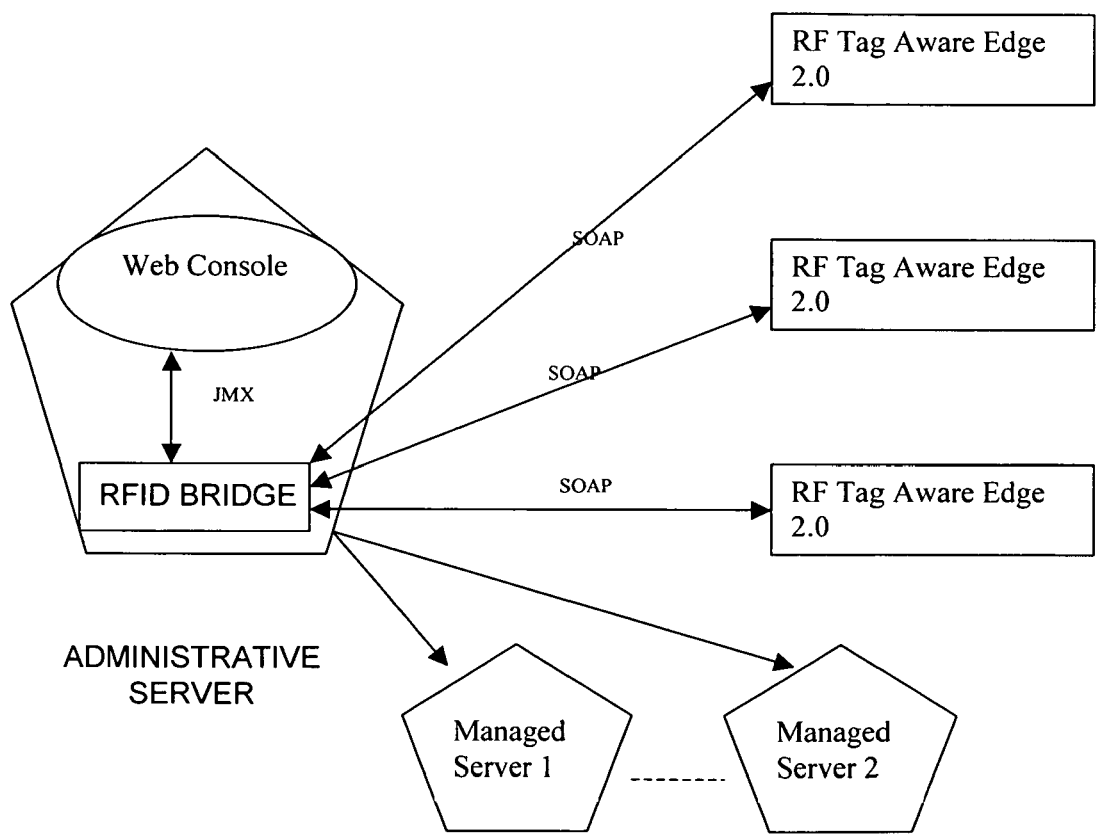
FIG. 7 shows an exemplary architecture of one embodiment.

FIG. 7 shows an exemplary architecture.

A telemetry data feed can be provided by each RFID edge server. RFID Console can include timeseries based telemetry for each RFID edge server. Telemetry can be available for
Devices
EddgeServer The telemetry data can be represented in RFID Console in form of charts.
For each edge server, following metrics can be available for charting
Event Cycles Completed
Programming Cycles Completed
Telemetry data for RFID device can vary from RFID device manufacturer to manufacturer. The data can be mostly count or aggregation of a metric. Most common metrics that are available on most of the devices are:
Read Cycle Time
Tags In Field
Read Count
The RFID Bridge can provide a servlet, which is deployed on an Admin Server, which listens for telemetry data from RFID edge server. The RFID Bridge can subscribe for time series telemetry data for each device in RFID edge server and metrics available on the edge server itself.
Telemetry Viewer can include following tabs for charting.
Views
Metrics
Properties
A tree-based hierarchy can be used to represent telemetry from various edge servers. Each edge server can contain multiple RFID reader devices, where each device can have different set of metrics. The Metrics tab in the Telemetry Viewer can have such a tree on the left side of the pane and right side is placeholder for all the charts that can be defined. Such a structure can be represented like:

-continued

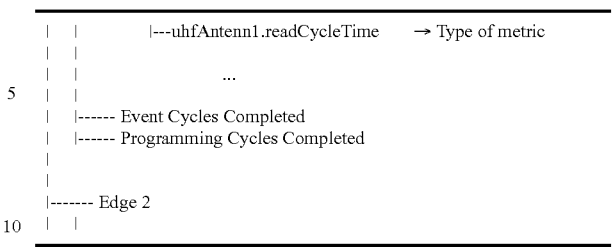

Telemetry charts can be created by simply dragging a metric from the metric browser and dropping it into the right hand. Charts can overlay (multiple metrics types in one chart) or can have one metric per chart.

In one embodiment, Telemetry subscription will be only be started for a metric when it is added to the right hand pane of the metric browser and subscription will be stopped when the chart is deleted by right clicking on the chart.

Figure 8A:
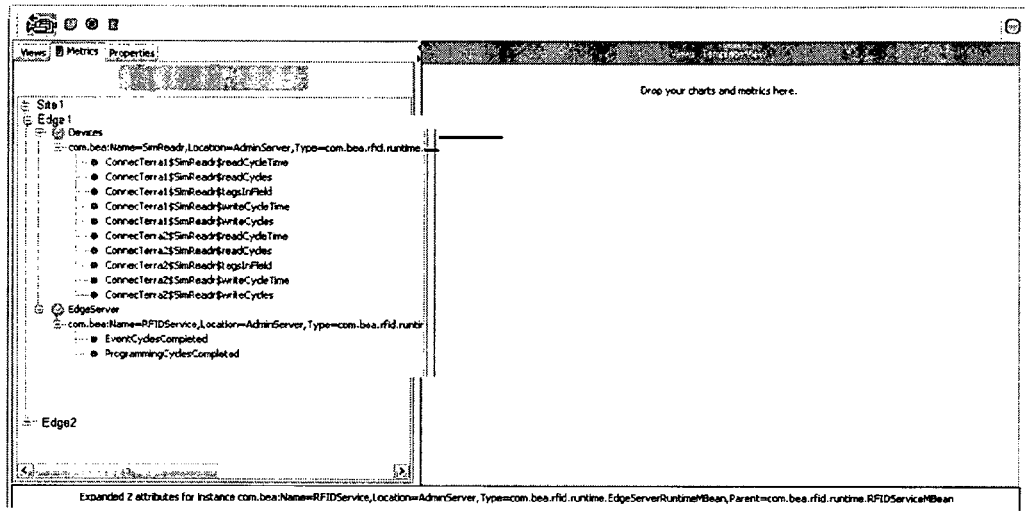
FIGS. 8A-8B shows exemplary RFID console pages.
Figure 8B:
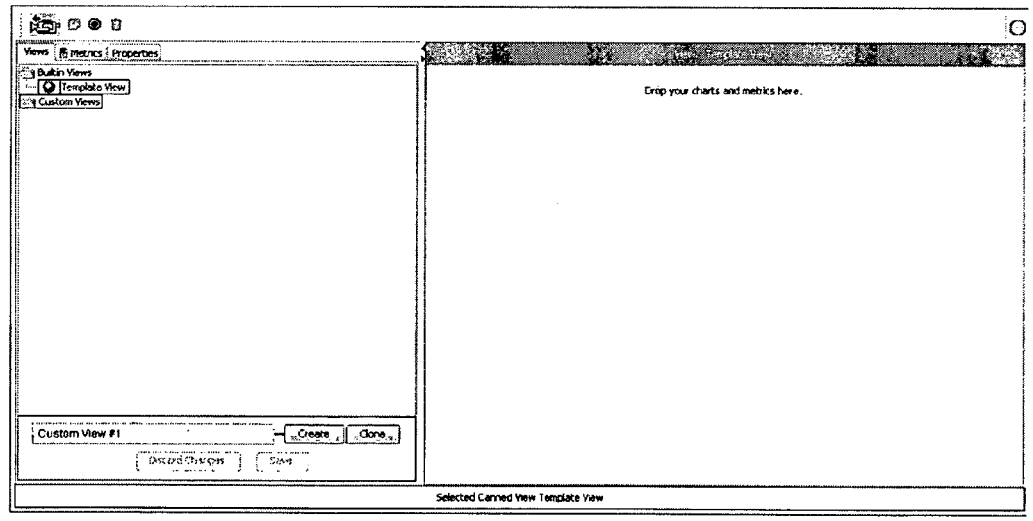
Figure 9:
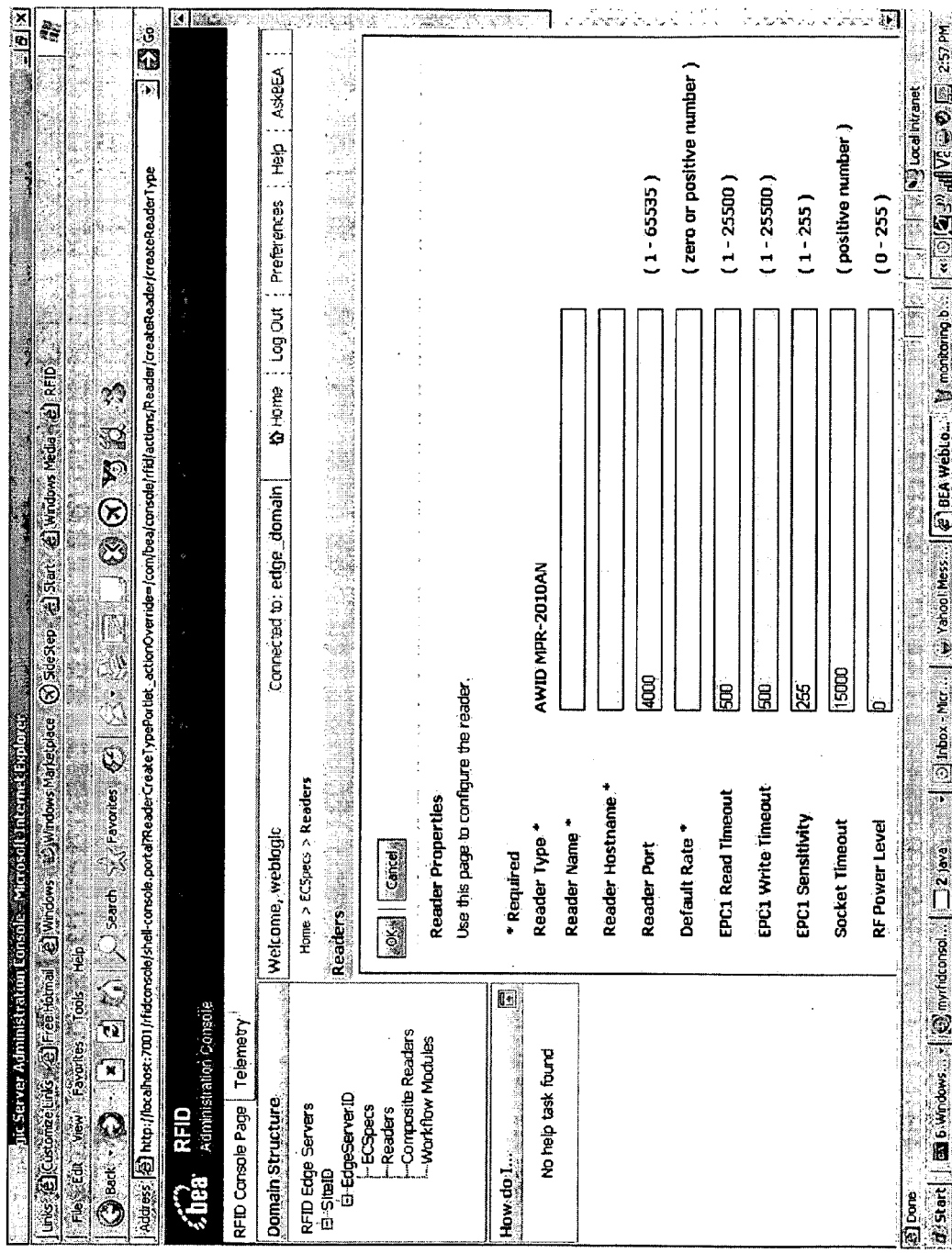
FIG. 9 shows an exemplary RFID console for adding RFID readers.

FIGS. 8A and 8B show a view tabs that can provide the ability for the user to define custom views for all metrics. All custom views can be persisted for later use RFID Bridge can provide the events for management of RFID resources to react to a "State changes", e.g. Events (or Alerts) or to a specific condition when it occurs in the RFID edge servers. RFID Console can "subscribes" to these events and displays all the events in the Alert Window. Enterprise Consoles, such as HP OV and BMC Patrol, can also subscribe to these events for diagnosis purposes The model which allows JMX Mbeans (broadcaster) to broadcast such management events is called notifications. Management applications and other objects can register as listeners with the broadcaster M'Bean.

The RFID Bridge can also have a time-based Alert Poller, which times out every n seconds (configurable). After expiration, a connection can be made to standalone RFID edge server, to retrieve all the RFID device alerts and status. If the status of the device is changed, since last time, a new event can be fired to update the device status.

The Alert Window in RFID Console can display events from all RFID edge servers deployed within the Enterprise. This can provide an aggregated view of all the events.

Every alert can have the following properties
Site ID Name of the Site
Edge ID Name of the Edge
Timestamp Time at which the event happened.
Severity Severity of the event. Severity will be one of the following
WARNING
INFO
ERROR

DESCRIPTION DETAILED DESCRIPTION OF THE EVENT

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

Implementation of One Embodiment

In one embodiment, the design can be as follows:

```
RFID Bridge Interfaces
public interface RFIDService extends Service{
    EdgeServerRuntime[ ] getEdgeServers( );
    String getType( );
    EdgeServerRuntime lookupEdgeServer(String name) throws
InstanceNotFoundException;
    EdgeServerRuntime addEdgeServer(String uri) throws
ManagementException;
    void removeEdgeServer(String uri) throws
InstanceNotFoundException,ManagementException;
    String exportConfiguration(String edgeID, List types, String
matchPattern) throws InstanceNotFoundException, ManagementException;
    void importConfiguration(String edgeID, Map elements, String
xmlFile, boolean overwriteExisting)
        throws InstanceNotFoundException, ManagementException;
}
public interface EdgeServerRuntime extends Service {
        public String getName( );
        String getType( );
        public String getEdgeURL( );
        public String getVersion( );
        public String getEdgeId( );
        public String getSiteId( );
        public String getState( );
        public void setState(String state);
        double getEventCyclesCompleted( );
        double getProgrammingCyclesCompleted( );
        public DeviceRuntime[ ] getDevices( );
        public DeviceRuntime addDevice(String name, String deviceMetaName,
Map deviceProperties) throws InstanceAlreadyExistsException,
ManagementException;
        void updateDevice(String name, String deviceMetaName, Map
deviceProperties) throws InstanceNotFoundException, ManagementException;
        void removeDevice(DeviceRuntime reader) throws ManagementException;
        public CompositeReaderRuntime[ ] getCompositeReaders( );
        public CompositeReaderRuntime addCompositeReader(String name,
String[ ] logicalReaders,
                                boolean
includeCompositeReaderName) throws InstanceAlreadyExistsException,
ManagementException;
        void updateCompositeReader(String name, String[ ] logicalReaders,
boolean includeCompositeReaderName) throws InstanceNotFoundException,
ManagementException;
        void removeCompositeReader(CompositeReaderRuntime reader) throws
InstanceNotFoundException, ManagementException;
        public ECSpecRuntime[ ] getECSpecs( );
        public ECSpecRuntime getECSpec(String name) throws
InstanceNotFoundException;
        public ECSpecRuntime defineECSpec(String name, String specData)
throws ManagementException, InstanceAlreadyExistsException;
        void undefineECSpec(ECSpecRuntime reader) throws
ManagementException;
        public Alert[ ] getAlerts( );
        void startTelemetry(String id);
}
public interface DeviceRuntime extends Service {
        String getName( );
        public String getState( );
        public Alert[ ] getAlerts( );
        String getDeviceType( );
        String getManufacturer( );
        String getModel( );
        String getHostname( );
        int getTCPPort( );
        int getAntennaCount( );
        AntennaRuntime[ ] getAntennas( );
        String[ ] getMetricNames( );
        double getCurrentValue(String metricName);
}
public interface AntennaRuntime extends Service {
    public String getName( );
}
public interface Alert {
    String getEdgeId( );
    String getSiteId( );
```

```
    String getDeviceId( );
    String getSeverity( );
    long getTimeStamp( );
    String getMessage( );
}
```

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EEPROM'S, EPROM's, DRMSs, flash memory devices, magnetic or optical cards, Nano systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A computer implemented system comprising:
a plurality of radio frequency identification (RFID) edge servers, each RFID edge server being associated with one or more RFID readers;
an RFID administration server, comprising a memory and a processor, that provides administration and monitoring for the RFID edge servers;
a data structure that stores at least data for the one or more RFID readers and an event cycle specification that specifies the event cycle and reports that are generated from said event cycle for each of said RFID edge servers;
an RFID bridge residing on the RFID administration server, said RFID bridge including a an event poller, a notification engine, an event listener engine, wherein the event poller periodically polls the RFID edge servers to monitor the health of the one or more RFID readers, detects a change in operation of an RFID reader specified by the event cycle specification and sends an event to the notification engine, wherein the notification engine broadcasts the event to the at least one management application registered to receive the event and wherein the event listener engine receives the event from the notification engine and stores the event to the data structure to collect the event;
an RFID management console used to administer the RFID edge servers, wherein the RFID management console queries each of the plurality of RFID edge servers to determine available operating metrics for said each RFID edge server;
wherein the RFID management console receives a selection of at least one of said available operating metrics by detecting a dragging and dropping of the selected operating metric onto a particular RFID edge server on said RFID management console; and
wherein the RFID administration server obtains data associated with the at least one selected operating metric from the data structure and produces a graphical interface that displays the obtained data plotted versus time.

2. The computer implemented system of claim 1, wherein the RFID edge servers implement application level events (ALE) protocol.

3. The computer implemented system of claim 1, wherein the RFID administration server uses simple object access protocol (SOAP) to communicate with the RFID edge servers.

4. The computer implemented system of claim 1, wherein the RFID administration server maintains a hierarchical data structure to store the data for the RFID edge servers.

5. The computer implemented system of claim 1, wherein:
the RFID bridge translates management messages to simple object access protocol (SOAP) messages for application level event (ALE) units at the plurality of RFID edge servers, such that the RFID Management console employs the RFID bridge to manage the plurality of RFID edge servers.

6. The computer implemented system of claim 1, wherein an MBean hierarchy is used to store management information associated with the plurality of RFID edge servers.

7. The computer implemented system of claim 6, further comprising:
one or more composite readers that combine two or more of the RFID readers as a single group, wherein the one or more composite readers are represented as MBeans.

8. The computer implemented system of claim 1, wherein each of the plurality of RFID edge servers has an associated workflow.

9. A method for monitoring an enterprise-side radio frequency identification (RFID) deployment, said method comprising:
providing an RFID administration server, comprising a memory and a processor, for administration and monitoring of a plurality of radio frequency identification (RFID) edge servers, each said RFID edge server being associated with one or more RFID readers; and
storing, into a data structure, data for the one or more RFID readers and an event cycle specification that specifies the event cycle and reports that are generated from said event cycle for each of said RFID edge servers;

providing an RFID bridge residing on the RFID administration server, said RFID bridge including an event poller, a notification engine, an event listener engine, wherein the event poller periodically polls the RFID edge servers to monitor the health of the one or more RFID readers, detects a change in operation of an RFID reader specified by the event cycle specification and sends an event to the notification engine, wherein the notification engine broadcasts the event to the at least one management application registered to receive the event and wherein the event listener engine receives the event from the notification engine and stores the event to the data structure to collect the event;

employing an RFID Management console to administer the RFID edge servers, wherein the RFID Management console queries each of the plurality of RFID edge servers to determine available operating metrics for said each RFID edge server;

receiving a selection of at least one of said available operating metrics by the RFID Management console detecting a dragging and dropping of the selected operating metric onto a particular RFID edge server; and wherein the RFID administration server obtains data associated with the at least one selected operating metric from the data structure and produces a graphical interface that displays the obtained data plotted versus time.

10. The method of claim 9, wherein the RFID edge servers implement application level events (ALE) protocol.

11. The method of claim 9, wherein the RFID administration server uses simple object access protocol (SOAP) to communicate with the RFID edge servers.

12. The method of claim 9, wherein the RFID administration server maintains a hierarchical data structure to store the data for the RFID edge servers.

13. The method of claim 9, wherein:
the RFID bridge translates management messages to simple object access protocol (SOAP) messages for application level event (ALE) units at the plurality of RFID edge servers, such that the RFID Management console employs the RFID bridge to manage the plurality of RFID edge servers.

14. The method of claim 9, wherein an MBean hierarchy is used to store management information associated with the plurality of RFID edge servers.

15. The method of claim 9, further comprising:
providing one or more composite readers that combine two or more of the RFID readers as a single group, wherein the one or more composite readers are represented as MBeans.

16. The method of claim 9, wherein each of the plurality of RFID edge servers has an associated workflow.

17. A non-transitory computer readable storage medium storing one or more sequences of instructions, wherein said instructions, when executed by one or more processors, cause the one or more processors to perform the steps of:
providing an RFID administration server for administration and monitoring of a plurality of radio frequency identification (RFID) edge servers, each said RFID edge server being associated with one or more RFID readers; and storing, into a data structure, data for the one or more RFID readers and an event cycle specification that specifies the event cycle and reports that are generated from said event cycle for each of said RFID edge servers;

providing an RFID bridge residing on the RFID administration server, said RFID bridge including an event poller, a notification engine, an event listener engine, wherein the event poller periodically polls the RFID edge servers to monitor the health of the one or more RFID readers, detects a change in operation of an RFID reader specified by the event cycle specification and sends an event to the notification engine, wherein the notification engine broadcasts the event to the at least one management application registered to receive the event and wherein the event listener engine receives the event from the notification engine and stores the event to the data structure to collect the event;

employing an RFID Management console to administer the RFID edge servers, wherein the RFID Management console queries each of the plurality of RFID edge servers to determine available operating metrics for said each RFID edge server;

receiving a selection of at least one of said available operating metrics by the RFID Management console detecting a dragging and dropping of the selected operating metric onto a particular RFID edge server; and wherein the RFID administration server obtains data associated with the at least one selected operating metric from the data structure and produces a graphical interface that displays the obtained data plotted versus time.

* * * * *

UNITED STATES PATENT AND TRADEMARK OFFICE
CERTIFICATE OF CORRECTION

| | | |
|---|---|---|
| PATENT NO. | : 7,904,548 B2 | Page 1 of 1 |
| APPLICATION NO. | : 11/381882 | |
| DATED | : March 8, 2011 | |
| INVENTOR(S) | : Shah et al. | |

Figure 6B:
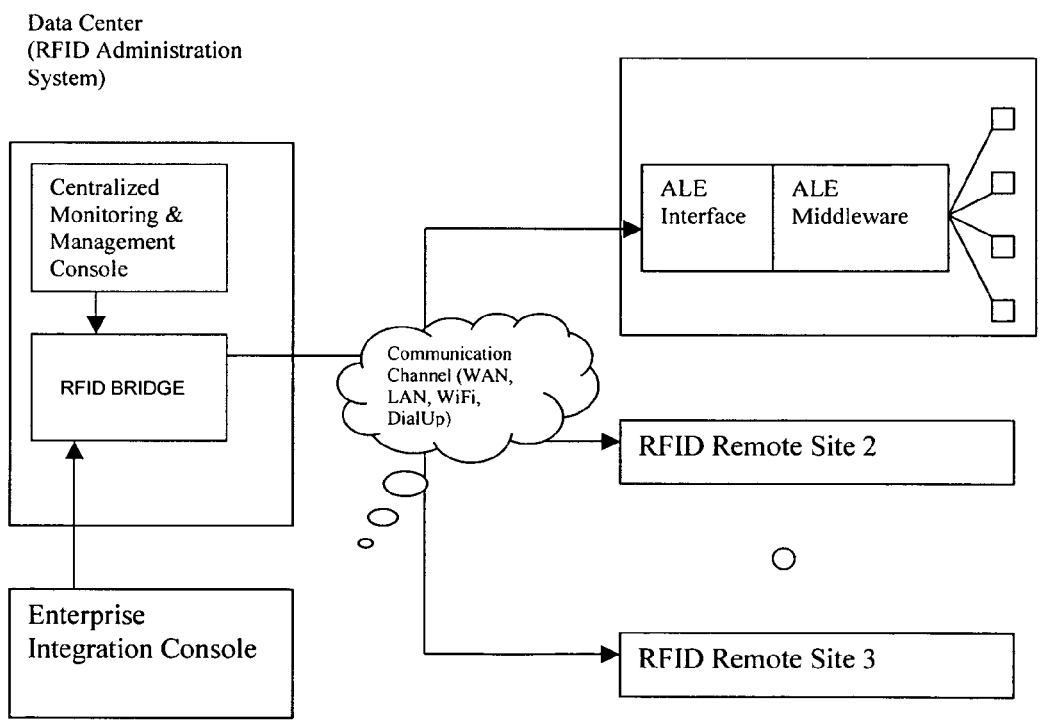
FIG. 6B is a diagram of one embodiment of the present invention.

It is certified that error appears in the above-identified patent and that said Letters Patent is hereby corrected as shown below:

On sheet 9 of 13, in figure 6 A, Above Reference Numeral 626, line 1, delete "RFID RFID Site" and insert -- RFID Site --, therefor.

In column 2, line 10, after "workflows" insert -- . --.

In column 2, line 37, delete "RID" and insert -- RFID --, therefor.

In column 3, line 12, delete "RFD" and insert -- RFID --, therefor.

In column 7, line 30, delete "EddgeServer" and insert -- EdgeServer --, therefor.

In column 8, line 23, after "use" insert -- . --.

In column 8, line 30, after "purposes" insert -- . --.

In column 8, line 34, delete "M'Bean." and insert -- MBean. --, therefor.

In column 8, line 54, delete "DESCRIPTION ETAILED" and insert -- DETAILED --, therefor.

In column 11, line 16, delete "EEPROM'S," and insert -- EEPROM's, --, therefor.

In column 11, line 59, in Claim 1, after "including" delete "a".

Signed and Sealed this
Eleventh Day of October, 2011

David J. Kappos
*Director of the United States Patent and Trademark Office*